(No Model.)
T. P. WALSH.
HEAD STAYING DEVICE FOR CASKS.
No. 355,039. Patented Dec. 28, 1886.
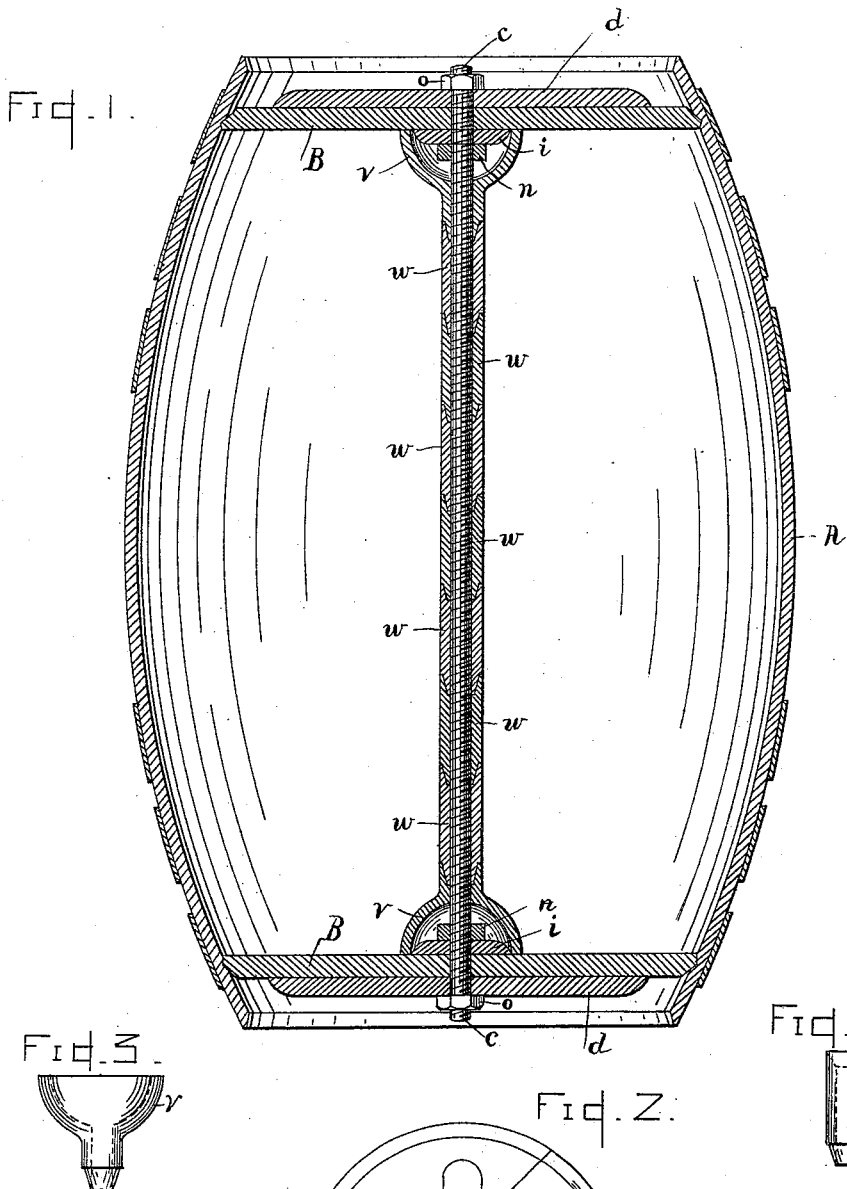
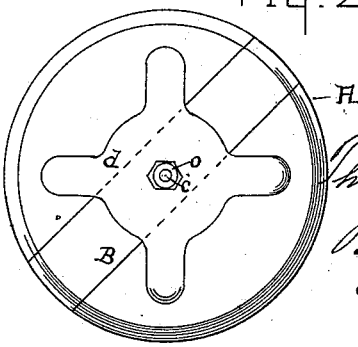
WITNESSES:
Fred W. Hersey
G. M. Chamberlain
INVENTOR:
Thomas P. Walsh
By Chapin &c.
Attys

UNITED STATES PATENT OFFICE.

THOMAS P. WALSH, OF SPRINGFIELD, MASSACHUSETTS.

HEAD-STAYING DEVICE FOR CASKS.

SPECIFICATION forming part of Letters Patent No. 355,039, dated December 28, 1886.

Application filed June 17, 1886. Serial No. 205,406. (No model.)

*To all whom it may concern:*

Be it known that I, THOMAS P. WALSH, a citizen of the United States, residing at Springfield, in the county of Hampden and State of Massachusetts, have invented new and useful Improvements in Head-Staying Devices for Casks, of which the following is a specification.

This invention relates to improvements in stays for barrel-heads, the object being to provide, particularly for beer-barrels, an improved stay between the heads thereof, to prevent said heads from being sprung or blown out of the barrel; and the invention consists in the peculiar construction and arrangement of said stay, its inner casing, and means for securing it to the heads of the barrel, all as hereinafter fully described, and set forth in the claims.

In the drawings forming part of this specification, Figure 1 is a longitudinal section of a barrel having applied thereto head-staying devices embodying my improvements. Fig. 2 is a plan view of one end of the barrel, showing the end flange, the end of the stay-rod, and its nut. Figs. 3 and 4 are parts of the casing which covers the metallic staying devices inside of the barrel, all as hereinafter fully set forth.

In the drawings, A indicates a barrel of the usual construction provided with the heads B.

The devices for staying the heads B of the barrel consist of the metal rod $c$, screw-threaded and passing through the barrel from end to end centrally, and having its ends projecting beyond the heads B. Against the outer sides of said heads is applied, preferably, a metallic flange, $d$, either round or having the outline form shown in Fig. 2, a flange being applied against each head, as shown in Fig. 1, and the said stay-rod $c$ extends through said flanges, and has a nut, $o$, upon each end, as shown. The stay-rod $c$ has thereon, under each head B of the barrel or within the latter, a metallic washer, $i$, and nut $n$, said nuts $n$ being screwed forcibly against said washers, and being made to fit the screwed stay-rod very closely, in order to obviate any tendency to leakage around the latter and through the head.

To obviate the inconvenience which might arise from permitting the contents of the cask from coming in contact with metal, whether said contents be beer or other substance, the said metallic stay-rod, or that part thereof between the heads of the cask and the metallic washers $i$ and nuts $n$, is inclosed within a wooden casing consisting of the parts $v\ v$, having a semi-spherical hollow end, and bored longitudinally to permit the stay-rod to pass through them, and which cover the nuts $n$ and washers $i$, as shown in Fig. 1, the shanks of said casing parts $v$ being either tapered exteriorly or internally to receive the ends of the intermediate casing parts, $w$, which are also of wood, of tubular form, and which cover that part of the stay-rod $c$ between the said end casing parts, $v$, said tubular casing parts $w$ having their ends fitted to enter one within the other, and tapered as shown, whereby when they are forced together the joints between the several pieces are made tight. In Figs. 3 and 4 are shown, respectively, one of the said interior end casings, $v$, and one of the intermediate tubular casings $w$, both in side elevation.

In applying the staying devices to the heads of the cask care is taken that the length of the casing parts when assembled upon the stay-rod $c$, between the heads, shall be such that, when the nuts $o$ are turned against the flanges $d$ to draw the heads together, the latter shall come to such a bearing against the open ends of the casing parts $v$ as shall make a tight joint between the latter and the heads, the nuts and washers $n\ i$ being so adjusted on said rod as to permit the heads to be brought to such a position against the ends of said parts $v$.

It will be seen from the above-described construction of the head-staying devices that the heads of the cask are rigidly secured against any outward spring or swelling on account of any great internal pressure, and that the metallic parts of the staying devices are so thoroughly covered and protected by the above-described wooden casing that the contents of the cask cannot come in contact with any of said metal parts.

What I claim as my invention is—

1. The within-described head-staying devices for casks, consisting of the screw-threaded rod $c$, passing through the cask and the heads thereof and projecting beyond the latter, a flange, $d$, against the outer side of each head, having said rod passing through it and secured thereagainst by means substantially as described, a nut and washer on said rod under each head of the cask, and a wooden casing, substantially as described, covering that part of said rod and said nuts and washers within the cask, substantially as set forth.

2. The combination, with the heads B B of the cask, of the stay-rod c, passing through the latter and projecting beyond each head and provided with a nut on each end thereof, a flange, d, between each nut and head, outside of the latter, and a wooden casing extending from head to head within the cask and inclosing said stay-rod, substantially as set forth.

THOMAS P. WALSH.

Witnesses:
H. A. CHAPIN,
G. M. CHAMBERLAIN.